US010511884B2

(12) United States Patent
Gage

(10) Patent No.: US 10,511,884 B2
(45) Date of Patent: *Dec. 17, 2019

(54) METHOD AND APPARATUS FOR PLAYING MULTIMEDIA AUDIO-VISUAL PRESENTATIONS

(75) Inventor: Kevin Gage, Katonah, NY (US)

(73) Assignee: Warner Media, LLC, New York, NY (US)

(*) Notice: Subject to any disclaimer, the term of this patent is extended or adjusted under 35 U.S.C. 154(b) by 211 days.

This patent is subject to a terminal disclaimer.

(21) Appl. No.: 13/338,520

(22) Filed: Dec. 28, 2011

(65) Prior Publication Data

US 2012/0101607 A1 Apr. 26, 2012

Related U.S. Application Data

(62) Division of application No. 10/072,531, filed on Feb. 8, 2002, now Pat. No. 8,166,093.

(60) Provisional application No. 60/267,336, filed on Feb. 8, 2001.

(51) Int. Cl.
| | |
|---|---|
| *G06F 17/00* | (2019.01) |
| *H04R 5/00* | (2006.01) |
| *H04N 21/439* | (2011.01) |
| *H04N 21/2368* | (2011.01) |
| *H04N 21/433* | (2011.01) |
| *H04N 21/434* | (2011.01) |
| *H04S 1/00* | (2006.01) |

(52) U.S. Cl.
CPC ....... *H04N 21/439* (2013.01); *H04N 21/2368* (2013.01); *H04N 21/4334* (2013.01); *H04N 21/4341* (2013.01); *H04S 1/00* (2013.01)

(58) Field of Classification Search
CPC . G06F 17/30743; G06F 17/00; G06F 17/3074
USPC ............ 348/485, 515; 700/94; 381/1, 17–19
See application file for complete search history.

(56) References Cited

U.S. PATENT DOCUMENTS

| | | | | | |
|---|---|---|---|---|---|
| 5,198,904 | A | * | 3/1993 | Ta et al. ........................ | 348/738 |
| 5,305,105 | A | * | 4/1994 | Heo .............................. | 348/485 |
| 5,392,045 | A | * | 2/1995 | Yee ............................... | 341/156 |
| 5,506,932 | A | * | 4/1996 | Holmes et al. ............... | 704/205 |
| 5,570,296 | A | * | 10/1996 | Heyl et al. .................... | 709/231 |
| 5,585,858 | A | * | 12/1996 | Harper et al. ................ | 348/485 |

(Continued)

OTHER PUBLICATIONS

International Search Report, PCT/US02/07123, dated Jun. 11, 2002 by the International Searching Authority of US.

*Primary Examiner* — Xu Mei
(74) *Attorney, Agent, or Firm* — Gottlieb, Rackman & Reisman, PC

(57) ABSTRACT

An apparatus and method is provided to generate digital audio signals, such as stereo signals, from a multimedia program. The program can be distributed directly through an electronic network, or indirectly by recording the program on a medium such as a DVD or CD. The multimedia program is normally compressed using a standard DVD, MPEG or similar compression protocol. In accordance with the invention, the program is decoded to generate a multimedia output signal and an audio output signal. The multimedia signals can be played immediately or at will on a suitable multimedia device. The audio output signal is compressed, using for instance MP3 or ATRAC3, and then transmitted to an external device for storage as a digital file. The digital file can then be replayed at will.

10 Claims, 4 Drawing Sheets

(56) References Cited

U.S. PATENT DOCUMENTS

| | | | |
|---|---|---|---|
| 5,611,038 A * | 3/1997 | Shaw et al. | 715/202 |
| 5,635,979 A * | 6/1997 | Kostreski et al. | 725/132 |
| 5,661,809 A * | 8/1997 | Chahabadi et al. | 381/13 |
| 5,721,878 A * | 2/1998 | Ottesen et al. | 725/87 |
| 5,748,842 A * | 5/1998 | Holmes et al. | 704/270 |
| 5,809,471 A * | 9/1998 | Brodsky | 704/275 |
| 5,828,402 A * | 10/1998 | Collings | 725/28 |
| 5,832,085 A * | 11/1998 | Inoue et al. | 386/230 |
| 5,861,881 A * | 1/1999 | Freeman et al. | 715/201 |
| 5,861,890 A * | 1/1999 | Sakai et al. | 345/619 |
| 5,872,942 A * | 2/1999 | Swanstrom et al. | 710/305 |
| 5,929,922 A * | 7/1999 | Stevens et al. | 348/485 |
| 5,982,459 A * | 11/1999 | Fandrianto et al. | 348/425.3 |
| 5,987,418 A * | 11/1999 | Gentit | 704/500 |
| 6,016,166 A * | 1/2000 | Huang et al. | 348/515 |
| 6,018,765 A * | 1/2000 | Durana et al. | 709/217 |
| 6,134,375 A * | 10/2000 | Naganawa et al. | 386/328 |
| 6,314,569 B1 * | 11/2001 | Chernock et al. | 725/37 |
| 6,345,028 B1 * | 2/2002 | Jaeger | 369/84 |
| 6,389,473 B1 * | 5/2002 | Carmel et al. | 709/231 |
| 6,578,201 B1 * | 6/2003 | LaRocca et al. | 725/86 |
| 6,580,462 B2 * | 6/2003 | Inoue et al. | 348/460 |
| 6,583,787 B1 * | 6/2003 | Pfister et al. | 345/441 |
| 7,174,512 B2 * | 2/2007 | Martin | G06Q 30/02 348/E5.097 |
| 8,166,093 B2 * | 4/2012 | Gage | H04N 21/2368 348/483 |
| 2002/0004839 A1 * | 1/2002 | Wine et al. | 709/231 |

* cited by examiner

METHOD AND APPARATUS FOR PLAYING MULTIMEDIA AUDIO-VISUAL PRESENTATIONS

RELATED APPLICATIONS

This application is a division of U.S. Ser. No. 10/072,531 filed Feb. 8, 2002, which claims priority to provisional application No. 60/267,336 filed Feb. 8, 2001 entitled METHOD AND APPARATUS FOR EXTRACTING AND STORING SONGS FROM MULTIMEDIA PRESENTATIONS, all incorporated herein by reference.

BACKGROUND OF THE INVENTION

A. Field of Invention

This invention pertains to a method and apparatus for retrieving and storing the audio portion of multimedia programs. More particularly, this invention pertains to a method and apparatus in which a multimedia program that may be optionally compressed is received and can be selectively played or used to generate a separate audio program that is saved as an audio file. The audio file can be replayed on a suitable device or transmitted electronically to another location.

B. Description of the Prior Art

Typically, programs depicting musical events are distributed to the public using one or more formats, such as multimedia formats (including an audio and a video component), multi-channel audio formats (e.g., 5.1 or six-channel) and stereo (or two-channel) formats. The customer can then replay the programs using an appropriate device.

The programs may be distributed either directly through a distributed computer network, such as the Internet, and/or indirectly, i.e., by recording the program on appropriate media. For example, programs in multimedia formats (unless otherwise noted, the term 'multimedia programs' and 'multimedia output signals refer to programs or signals that include a multi-channel audio track with or without a video track) are recorded on CDs, DVDs, video tapes and so. Programs in stereo formats are recorded either as analog signals, using for instance magnetic tapes, or digitally on flash memory cards, as well as CDs or other similar storage means. Of course, a multimedia program contains much more information then a stereo program.

A problem with the existing distribution means is that they are expensive for the producer if a program is made available in multiple formats. Existing distribution means are also disadvantageous for customers who often buy multiple devices suitable for playing programs in different formats.

Moreover, while devices, such as digital portable devices, exist that can be used to store and replay digital audio files. However, these devices cannot be used for multimedia programs directly because multimedia programs are inherently large and hence it is impractical to store directly them on a digital portable device. Moreover, multimedia programs are drastically compressed using high-level compression protocols, such as MPEG4, and digital portable devices do not have the computational power required to decompress these programs.

OBJECTIVES AND SUMMARY OF THE INVENTION

An objective of the present invention is to provide an apparatus that can be used to convert a multimedia program into a multimedia output signal suitable to be shown on a multimedia player, and also to obtain a corresponding output audio signal that can be stored and replayed on an audio device.

A further objective is to provide an apparatus that can generate from a multimedia program an audio signal that can be stored and replayed at will independently of the original program.

A further objective is to provide an apparatus of the kind described above that can be implemented easily and inexpensively.

Other objectives and advantages of the invention will become apparent from the following description.

Briefly, in a preferred embodiment the apparatus constructed in accordance with this invention includes an input port used to receive a multimedia program; a separator coupled to the input port and adapted to selectively generate corresponding multimedia output signals from said multimedia program, and an audio output stage adapted to generate an audio output signal.

Preferably, the input port is adapted to receive a broadband multimedia program but, alternatively, it may include a media reader such as a DVD or a CD reader.

In one embodiment, the separator is adapted to generate multimedia signals including an audio and a video component. In an alternate embodiment, the separator generates a multichannel audio signal, i.e., without a video component.

The audio output stage preferably includes a folder circuit adapted to fold the multichannel audio signal into a stereo channel audio signal. The output stage includes a compressor that compressor the stereo channel audio signal into a compressed digital output signal, using a standard protocol such as MPEG or ATRAC.

The digital output signal can be transmitted via a standard data bus, such as a serial, parallel or USB bus, to an audible device, such as a portable digital device and stored in its solid state memory. The customer can then replay the stored audio signal at will.

The audio program can also be replayed on any home stereo system. Alternatively, the audio program is transmitted through the Internet or other means to another customer.

The multimedia program could include various control and data signals, including information related to the program, its contents, the recording artist, the location of the recording, and so on. This information can be incorporated into the output audio signal stored on the portable digital device and shown selectively to the customer.

DETAILED DESCRIPTION OF THE INVENTION

Figures 1, 2A, 2B, 2C:
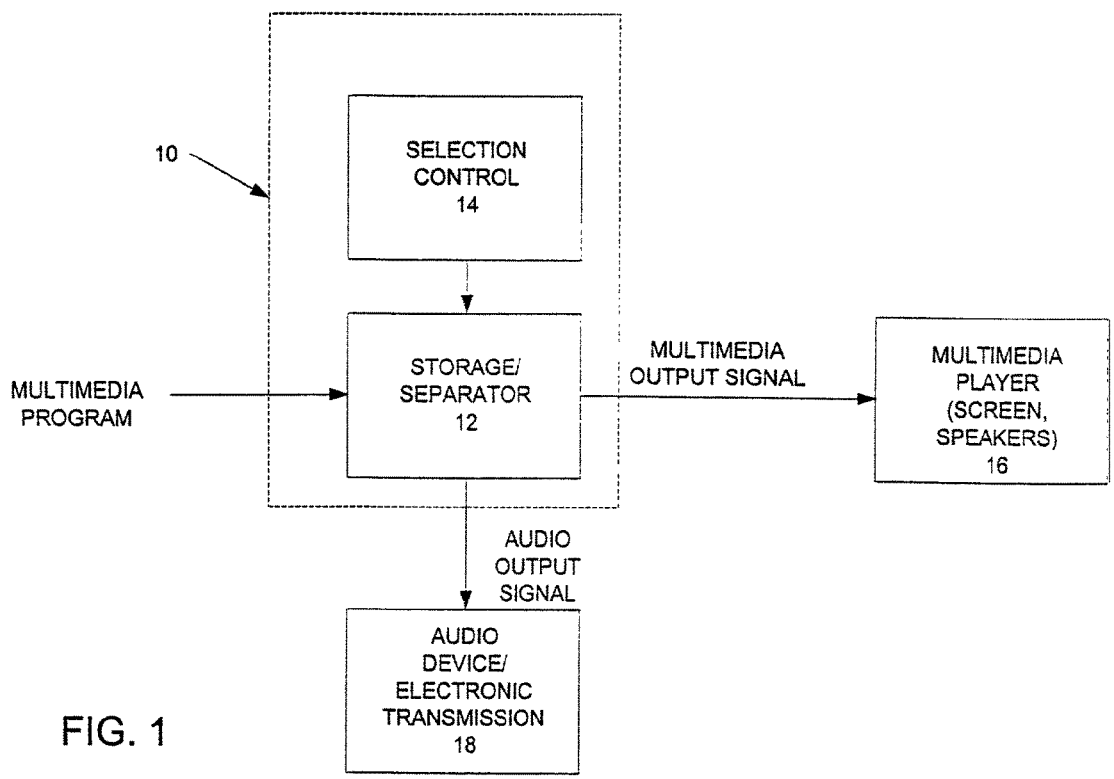
FIG. 1 is a general block diagram of an apparatus constructed in accordance with this invention.
FIG. 2A shows somewhat diagrammatically the contents of a typical multimedia program.
FIG. 2B shows somewhat diagrammatically the multimedia output signal generated by the apparatus of FIG. 1.
FIG. 2C shows somewhat diagrammatically the audio output signal generated by the apparatus of FIG. 1 for an audio device.

Referring now to FIG. 1, an apparatus 10 is shown including a storage/separator member 12 and a selection controller 14. The apparatus 10 is adapted to receive multimedia programs either directly, from the Internet, or indirectly, from a recorded medium, as described in more detail below. The multimedia program may be encoded using a standard protocol.

Typically, as shown in FIG. 2A, the multimedia program includes a video track, a respective audio track, program information describing the program or programs, including, for instance, the names of the artists, the place where the program was recorded and other information that may be of interest to a customer. If the program includes several selections, then timing signals may also be included that define where each selection begins and/or ends. Typically, all these tracks and information are compressed and encoded so that an individual component cannot be simply partitioned from the program, but instead the whole program must be decompressed and decoded. However, one skilled in the art will appreciate that the invention is also applicable to uncompressed and/or uncoded programs.

The customer provides commands through the selection control 14 to define what programs to receive and play. The storage/separator member 12 receives and stores the multimedia program, and then, in response to the commands from the customer, it converts the multimedia program into a sequential multimedia output signal suitable for display to the customer by the multimedia player 16. The player 16 may include, for example, a screen and a plurality of speakers (not shown) arranged and constructed to play the video and audio tracks synchronously. This multimedia output signal is shown somewhat diagrammatically in FIG. 2B.

Importantly, the converter/separator 12 is also adapted to selectively process the received multimedia program and generate a strictly audio output signal. As shown in FIG. 2C, this audio output signal includes an audio track, preferably a stereo rendition of the multichannel audio track. If the multimedia program includes several sequential segments, then the customer may elect to obtain a stereo audio track for only some of the segments.

Moreover, the audio output signal can also include at least some information associated with the programs or the individual program segments selected by the customer.

The audio output signal is received by an audio device 18 which is adapted to store the output audio signal and to selectively play the same as desired by a customer. In one embodiment, the device 18 is a digital device with a flash card memory, adapted to store and retrieve digital data and convert the same into corresponding audio signals.

Figure 3:
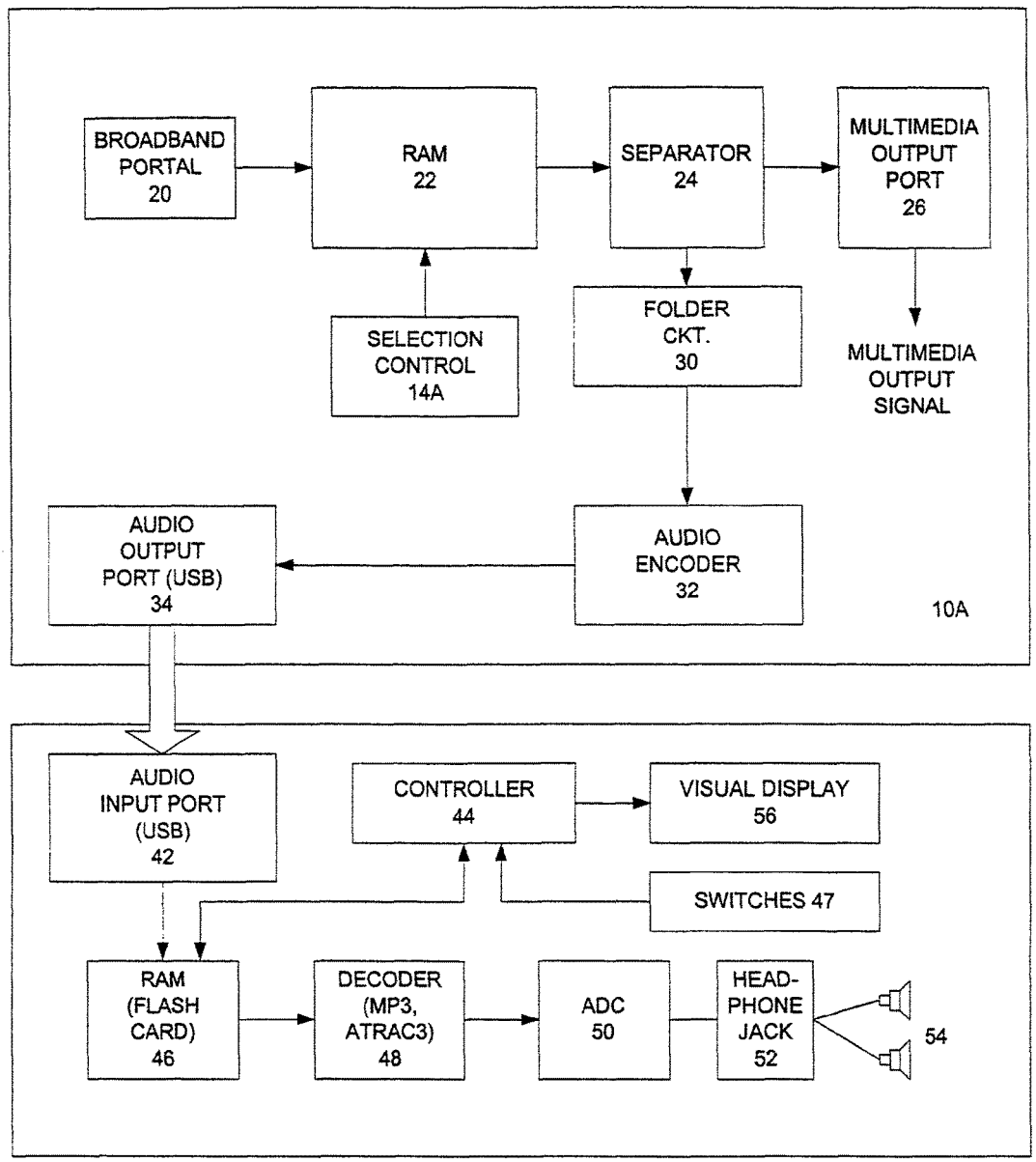
FIG. 3 shows a block diagram showing the components for an embodiment of the apparatus of FIG. 1 wherein multimedia programs are received via a broadband portal.

Referring now to FIG. 3, in a preferred embodiment of the invention, apparatus 10A is a set-top box such as a personal video recorder adapted to receive a multimedia program in the form of a streaming broadband transmission over the Internet. This streaming transmission may be a standard transmission using push technology, or may be 'on demand' in the sense that it is transmitted in response to a selection by the customer. Alternatively, for the purposes of this invention, the multimedia program may also be transmitted as a data file, rather than by streaming.

In any event, prior to transmission, the multimedia program is compressed using a standard compression protocol such as MPEG-4, or any other similar formats.

Apparatus 10A includes a broadband or other type of multimedia input port 20 for receiving the multimedia program. The received multimedia program is stored in a RAM 22.

A customer can elect to play the stored multimedia program at any time, by operating selection control 14A. In response, the program is retrieved from RAM 22. It is then decompressed and decoded by separator circuit 24 and the resulting multimedia output signal is sent to the multimedia output port 26. From this port, the multimedia signal is then fed to an appropriate multimedia player, as discussed above in conjunction with FIG. 1.

In addition, the customer can also request a stereo output signal from the multimedia program. This stereo output signal can be generated concurrently with the multimedia output signal, or can be generated completely independently.

When a request for a stereo output signal is received, the separator 24 retrieves the multimedia program from RAM 22 (unless it was retrieved earlier), decompresses and decodes it (if necessary), and separates a multichannel audio signal therefrom. This multichannel audio signal is fed to an audio output stage including a folder circuit 30, an encoder 32 and an audio output port 34. The folder circuit 30 folds the multichannel (for example, 5.1 or six-channel) audio signal into a corresponding stereo audio signal. Algorithms for this operation are well known in the art.

The resulting stereo audio signal is fed to the audio encoder 32 which encodes and compresses it into a corresponding digital audio signal, using a known compression protocol such as MPEG (e.g., MP3) or ATRAC. The resulting audio output signal is sent to the audio output port 34. The output port 34 may be a serial data port, a parallel data port, or preferably a USB port.

The audio output signal is then preferably stored by the customer on a suitable device for future replay. For example, digital portable audio devices are now available which can be used to store audio signals in the form of digital files, and then replay the audio signals at will. These devices (made by many companies, such as Samsung, RCA, Casio, Diamond, etc.) are portable battery-operated devices that can be taken by customers anywhere and used to play audio selections, in the same manner that audio selections are played from CDs or magnetic tapes.

As shown in FIG. 3, typically such an audio device 40 includes an audio port 42, a controller 44 and a data storage element, such as a RAM 46. The audio port can be a standard data port such as a serial data port, a parallel data port, or a USB port. The RAM can be, for example, a digital flash card.

The digital output audio signal received from the audio port 42 is stored in the RAM 46.

The device 40 is also provided with means for receiving commands from a customer, such as switches 47. The switches 47 are connected to the controller 44.

When a customer requests an audio signal (or a selection from an audio signal) stored in RAM 46, the corresponding data is transferred to a decoder 48. The decoder 48 decodes and decompresses the data into a digital signal and sends it to an analog-to-digital converter (ADC) 50. The ADC 50 converts the digital signal into a corresponding analog signal. The analog signal is sent to an analog output such as a headphone jack 52. The customer can then listen to the selected audio signal through speakers or headphones 54.

As shown in FIG. 2A, the multimedia program includes not only the audio and visual tracks, but also various control signals, timing signals and other program information. The audio encoder 32 is configured so that it also receives some of this program information and incorporates it into the audio signal, as shown in FIG. 2C.

If device 42 is equipped with a visual display 56, then the controller 44 shows on display 56 the program information associated with the audio signals stored in RAM 46 or selected by the customer.

Figure 4:
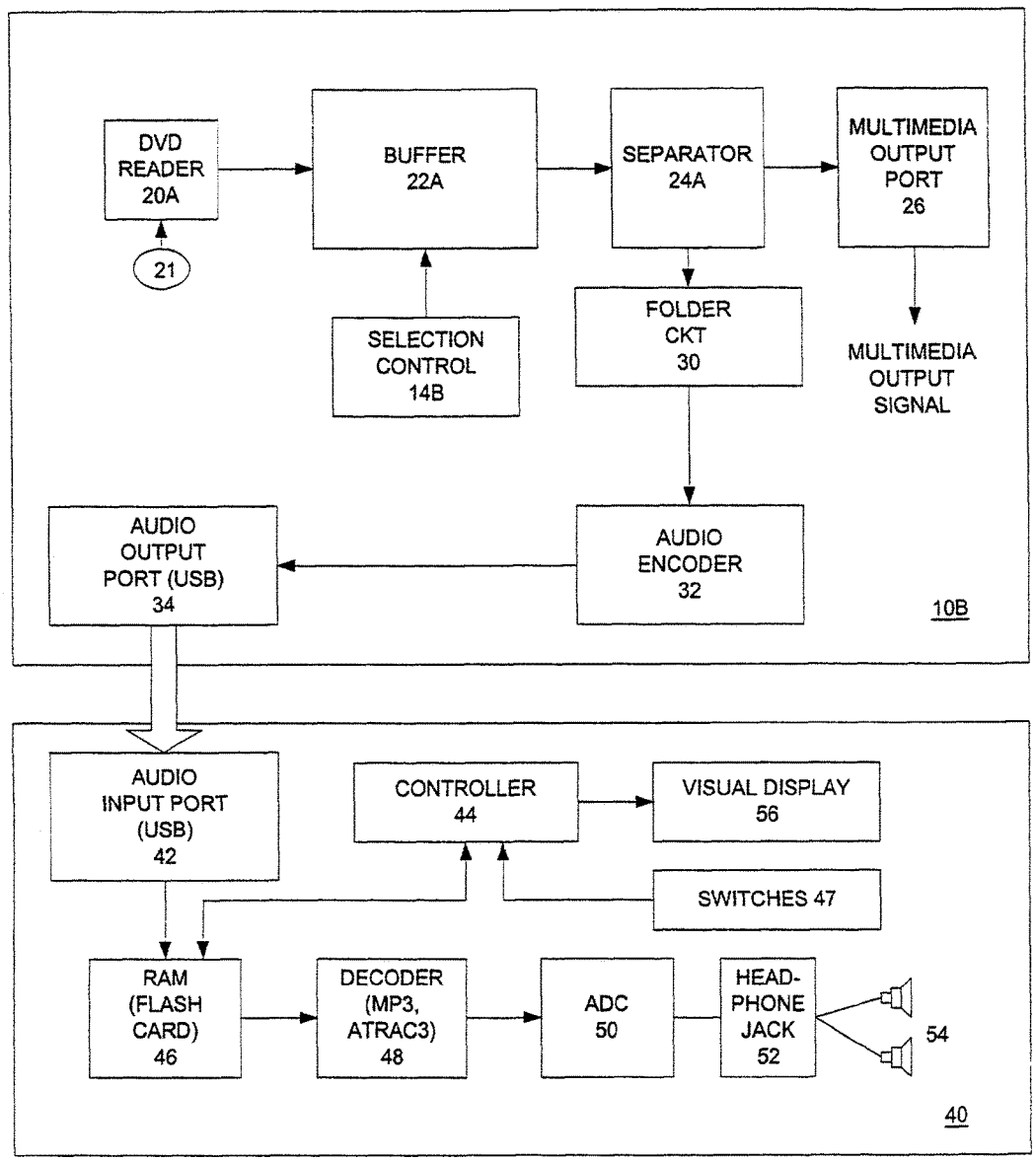
FIG. 4 shows a block diagram showing the components for another embodiment of the apparatus of FIG. 1 wherein multimedia programs are read from a DVD.

FIG. 4 shows an alternate embodiment of the invention. In this embodiment, apparatus 10B is adapted to receive multimedia programs that have been pre-recorded on an appropriate medium such as a DVD. In the apparatus 10B the multimedia input port includes a DVD reader 20A used to receive and read a DVD 21. The multimedia program is recorded on DVD in a compressed format using an appropriate DVD protocol. In other words, in this embodiment, apparatus 10B is a modified DVD player.

Once a DVD 21 is inserted into the DVD reader 20A, the reader 20A reads the data from the DVD 21 and transfers it into a buffer 22A. Separator 24 decompresses the data and separates into a corresponding multimedia output signal that is then transmitted to the multimedia output port 26.

In addition, the apparatus 10B can also be used to generate from the multimedia program recorded on DVD 21 a corresponding audio output signal in a manner similar to the set top apparatus 10A, discussed above. The main difference between the two apparatuses is that the separator 24A has to decode and decompress the data using DVD standards.

Audio-only multimedia programs are also distributed that include a multichannel audio track but without the video track. These programs can also be distributed directly or recorded on a medium such as a CD or a DVD. From a customer's point of view, these programs have the same disadvantages as the multimedia programs with video components: they cannot be played on a portable audio player.

Figure 5:
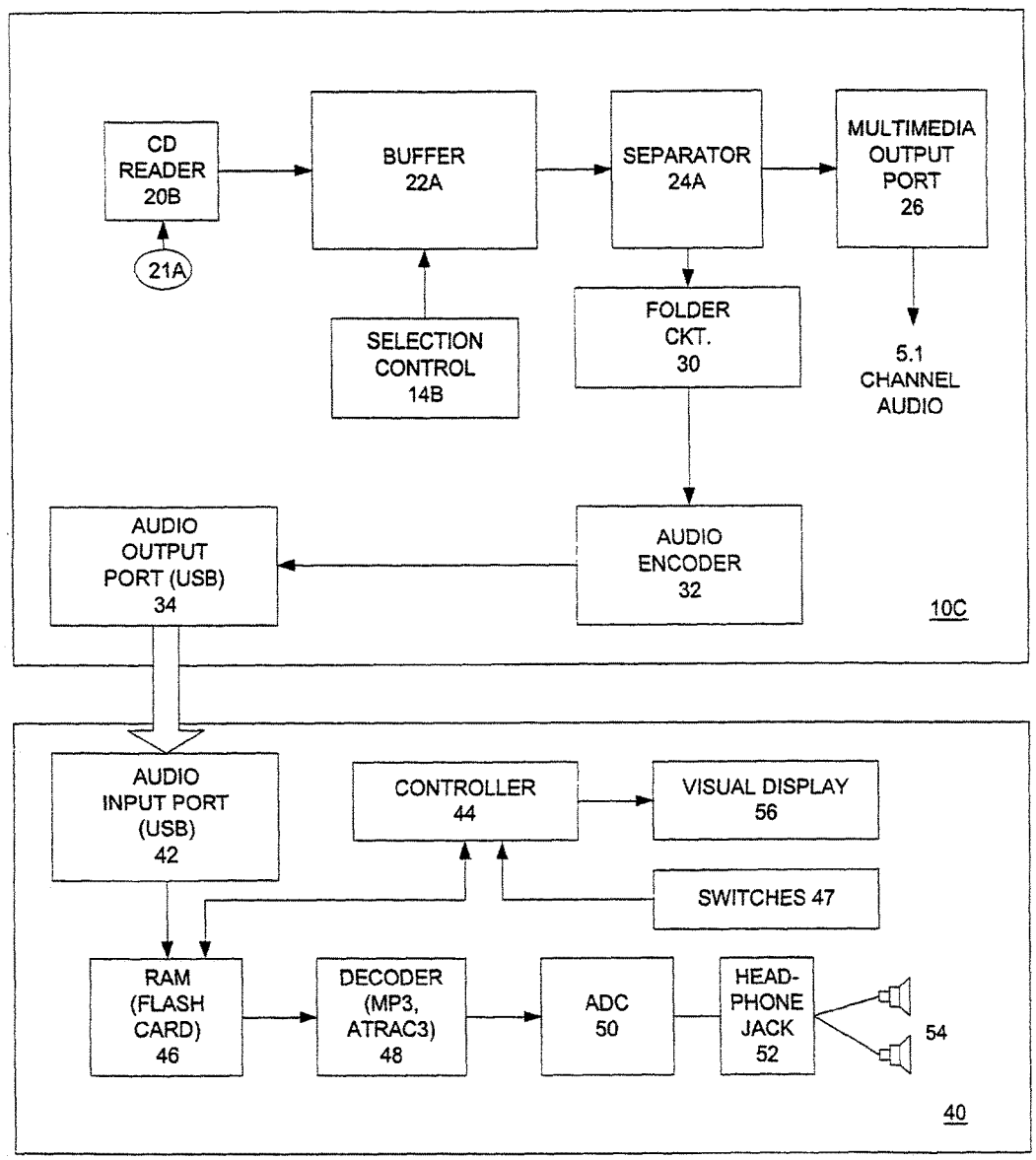
FIG. 5 shows a block diagram showing the components for one embodiment of the apparatus of FIG. 1 wherein multimedia programs are read from a CD.

The embodiment of FIG. 5 shows how the present invention can be used to remedy this problem as well. In FIG. 5, an apparatus 10C is shown that is used to generate a multichannel (such as 5.1 channel) output. The apparatus 10C includes a CD reader 20B that is used to read the multimedia program on a CD 21A. The apparatus 10C operates in the same manner as the apparatus 10B in FIG. 4, except that the multimedia output port 26A generates only a multichannel audio output rather than a multimedia output. Of course, the apparatus of FIG. 4 may be used to generate only multichannel audio output as well.

In the embodiments described above, the apparatuses 10, 10A, 10B are constructed to generate both a multimedia output signal and a multichannel audio signal. An output audio stage is then used to generate the output audio signal. Thus, the apparatus can be easily implemented by adding the output audio stage to existing devices. Alternatively, the apparatus 10, 10A, 10B can be configured to generate only the output stereo signal, in which case the multimedia output port can be omitted and the operation of the separator can be simplified.

In the embodiments described above, the output audio port 34 is connected to a portable digital player 40. Alternatively, the audio port 34 can be connected to a recording device (not shown) that can be used to record the output audio signals on a suitable medium. For example, the audio port 34 could be connected to a CD burner that records the output audio signals on a CD, including a miniature CD (or MD).

In general, the audio port 34 could be connected to any device suitable to play audio programs. Alternatively, the signals from audio port 34 could be transmitted electronically to other customers via the Internet, or by other means.

Finally, an ADC (not shown) may be incorporated into the apparatus 10A and used to generate analog instead of digital output signals. These analog signals can then be recorded by a standard tape recorder on magnetic tape.

Numerous other modifications may be made to the invention without departing from its scope as defined in the appended claims.

I claim:

1. An apparatus for processing a multimedia program composed of a compressed signal, the multimedia program including a compressed audio program component and a compressed video program component, said audio program component including an audio track for the video program component, said audio program component and video program component being configured to be played synchronously and simultaneously by a multimedia player as said multimedia program, said apparatus comprising:
   an input port receiving a single input signal consisting of said compressed signal;
   a signal processor coupled to said input port and being configured to perform all the signal processing of said compressed signal, said signal processor being adapted to selectively extract said audio program component from said compressed signal without extracting and uncompressing said video program component from said compressed signal, wherein said audio program component includes a multichannel audio signal;
   an audio output stage including a folder circuit adapted to fold said multichannel audio signal into a stereo channel audio signal; and
   an output port for outputting said stereo channel audio signal.

2. The apparatus of claim 1 wherein said input port is adapted to receive a broadband multimedia program.

3. The apparatus of claim 1 wherein said input port includes a media reader.

4. The apparatus of claim 3 wherein said input port includes a DVD reader.

5. The apparatus of claim 1 wherein said signal processor is further adapted to generate output signals including said multichannel audio signal.

6. The apparatus of claim 1 wherein said audio output stage further includes a compressor configured to compress said stereo channel audio signal into a compressed digital output signal.

7. The apparatus of claim 6 wherein said compressor is configured to compress said stereo channel audio signal using an MPEG standard.

8. The apparatus of claim 6 wherein said compressor is configured to compress said stereo channel using an ATRAC standard.

9. A method of processing a compressed multimedia program in a processing apparatus for play on an incompatible digital audio device comprising the steps of:
   receiving said compressed multimedia program on a single input port, said multimedia program including an audio component and a video component, said audio component including an audio track for the video component, said audio and video components being configured to be played synchronously and simultaneously on a multimedia player, said audio and video components being compressed to form said compressed multimedia program using a standard compression protocol;

selectively extracting said audio component from said multimedia program without uncompressing said video component using a signal processor configured to decompress said multimedia program in said processing apparatus to obtain only said audio component and without said video component;

processing said audio component to generate a processed audio signal in a format compatible with the digital audio device so that said processed audio signal is playable on the digital audio device, wherein said processed audio signal is a multichannel audio signal; and folding said multichannel audio signal into a stereo audio signal; and outputting said stereo audio signal to the digital audio device.

10. The method of claim 9 wherein said multimedia program is received electronically from a distribution network, further comprising storing said multimedia program.

\* \* \* \* \*